US012607726B2

(12) United States Patent
Lei

(10) Patent No.: US 12,607,726 B2
(45) Date of Patent: Apr. 21, 2026

(54) DETECTION METHOD AND DETECTION APPARATUS

(71) Applicant: Ningbo ABAX Sensing Electronic Technology Co., Ltd., Ningbo City (CN)

(72) Inventor: Shuyu Lei, Ningbo City (CN)

(73) Assignee: Ningbo ABAX Sensing Electronic Technology Co., Ltd., Ningbo City (CN)

( * ) Notice: Subject to any disclaimer, the term of this patent is extended or adjusted under 35 U.S.C. 154(b) by 973 days.

(21) Appl. No.: 17/788,375

(22) PCT Filed: Dec. 11, 2020

(86) PCT No.: PCT/CN2020/135675
§ 371 (c)(1),
(2) Date: Jun. 23, 2022

(87) PCT Pub. No.: WO2021/129413
PCT Pub. Date: Jul. 1, 2021

(65) Prior Publication Data
US 2023/0050937 A1 Feb. 16, 2023

(30) Foreign Application Priority Data

Dec. 26, 2019 (CN) .......................... 201911371643.6

(51) Int. Cl.
*G01S 7/487* (2006.01)
*G01S 7/48* (2006.01)
(Continued)

(52) U.S. Cl.
CPC ............ *G01S 7/487* (2013.01); *G01S 7/4802* (2013.01); *G01S 7/484* (2013.01); *G01S 17/10* (2013.01); *G01S 17/89* (2013.01)

(58) Field of Classification Search
CPC ........ G01S 7/487; G01S 7/4802; G01S 7/484; G01S 17/10; G01S 17/89; G01S 7/4911; G01S 7/493; G01S 17/32; G01S 7/481
See application file for complete search history.

(56) References Cited

U.S. PATENT DOCUMENTS 11,166,004 B2   11/2021   Bian et al.
2011/0032508 A1   2/2011   Ludwig et al.
(Continued)

FOREIGN PATENT DOCUMENTS

CN   103234479 A   8/2013
CN   103592026 A   2/2014
(Continued)

OTHER PUBLICATIONS

International Search Report, China National Intellectual Property Administration, Application No. PCT/CN2020/135675, mailed Mar. 3, 2021, 5 pages.

*Primary Examiner* — Isam A Alsomiri
*Assistant Examiner* — Joseph C Fritchman
(74) *Attorney, Agent, or Firm* — Ziegler IP Law Group, LLC.

(57) ABSTRACT

The present invention relates to the field of radar detection. Provided are a detection method and a detection apparatus. The method comprises: emitting a first waveform signal to a target to undergo detection, and receiving a second waveform signal reflected by the target on the basis of the first waveform signal, the second waveform signal carrying spatial modulation information; generating, on the basis of the second waveform signal, a detection signal corresponding to the spatial modulation information, and obtaining a signal flight time carried on the detection signal; and deter-
(Continued)

Acquire a target detection signal greater than or equal to a detection signal threshold from detection signals respectively corresponding to spatial modulation matrixes, to obtain one or more target detection signals — 1001

Multiply each of the target detection signals by the corresponding spatial modulation matrix and the corresponding signal flight time to obtain a multiplication result, and accumulate and average the multiplication result to obtain a first measurement time matrix — 1002

Multiply the first measurement time matrix by a percentage of non-zero elements in the spatial modulation matrix to obtain a product, and divide the obtained product by the number of the one or more target detection signals to obtain a second measurement time matrix — 1003

Determine distance data of a to-be-detected target based on matrix elements in the second measurement time matrix — 1004 mining distance data of the target on the basis of multiple pieces of the spatial modulation information and signal flight times corresponding thereto.

7 Claims, 7 Drawing Sheets

(51) Int. Cl.
*G01S 7/484*          (2006.01)
*G01S 17/10*          (2020.01)
*G01S 17/89*          (2020.01)

(56)                    References Cited

U.S. PATENT DOCUMENTS

| | | | |
|---|---|---|---|
| 2013/0088726 A1* | 4/2013 | Goyal | G01S 17/10 |
| | | | 356/634 |
| 2019/0162823 A1* | 5/2019 | Eckstein | G01S 13/865 |
| 2019/0293794 A1 | 9/2019 | Zhang et al. | |
| 2019/0353759 A1* | 11/2019 | Christmas | G01S 7/4817 |
| 2021/0072379 A1* | 3/2021 | Christmas | G01S 7/4863 |
| 2022/0413149 A1* | 12/2022 | Haag | G01S 7/4814 |
| 2024/0094348 A1* | 3/2024 | Haag | G01S 7/4816 |

FOREIGN PATENT DOCUMENTS

| | | |
|---|---|---|
| CN | 107121682 A | 9/2017 |
| CN | 109901160 A | 6/2019 |
| CN | 110425986 A | 11/2019 |
| CN | 111123284 A | 5/2020 |

* cited by examiner

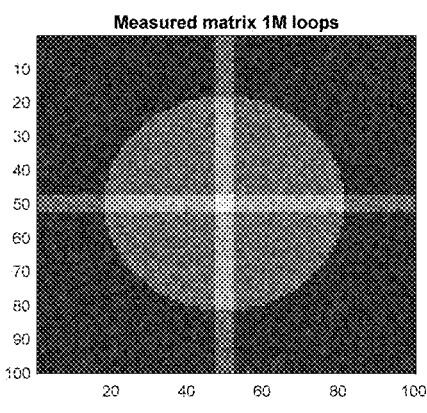

FIG. 6e

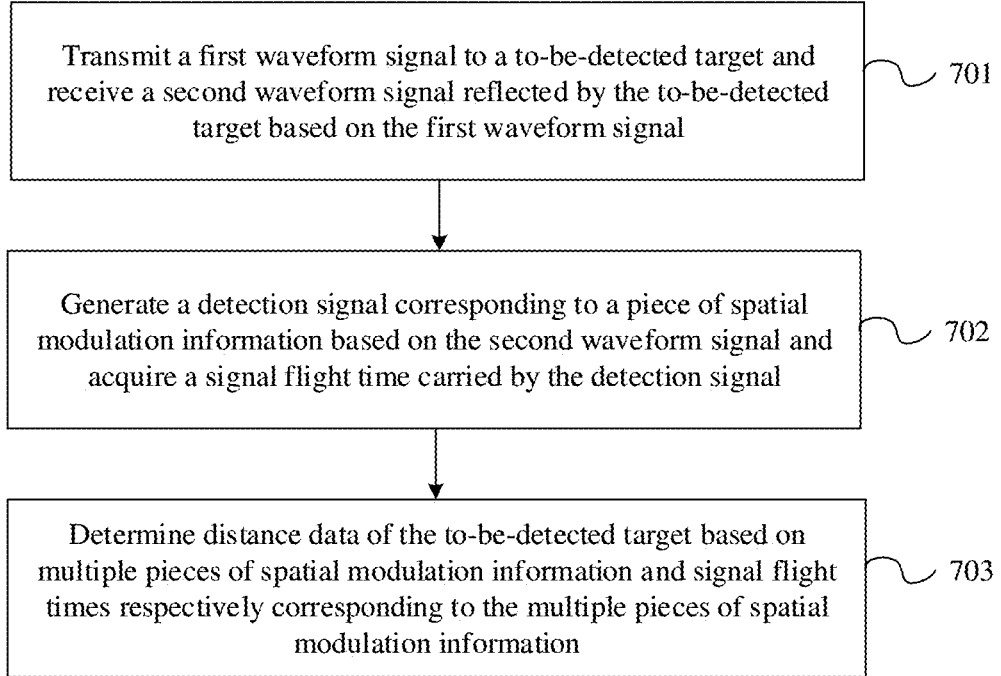

Transmit a first waveform signal to a to-be-detected target and receive a second waveform signal reflected by the to-be-detected target based on the first waveform signal          701

Generate a detection signal corresponding to a piece of spatial modulation information based on the second waveform signal and acquire a signal flight time carried by the detection signal          702

Determine distance data of the to-be-detected target based on multiple pieces of spatial modulation information and signal flight times respectively corresponding to the multiple pieces of spatial modulation information          703

FIG. 7

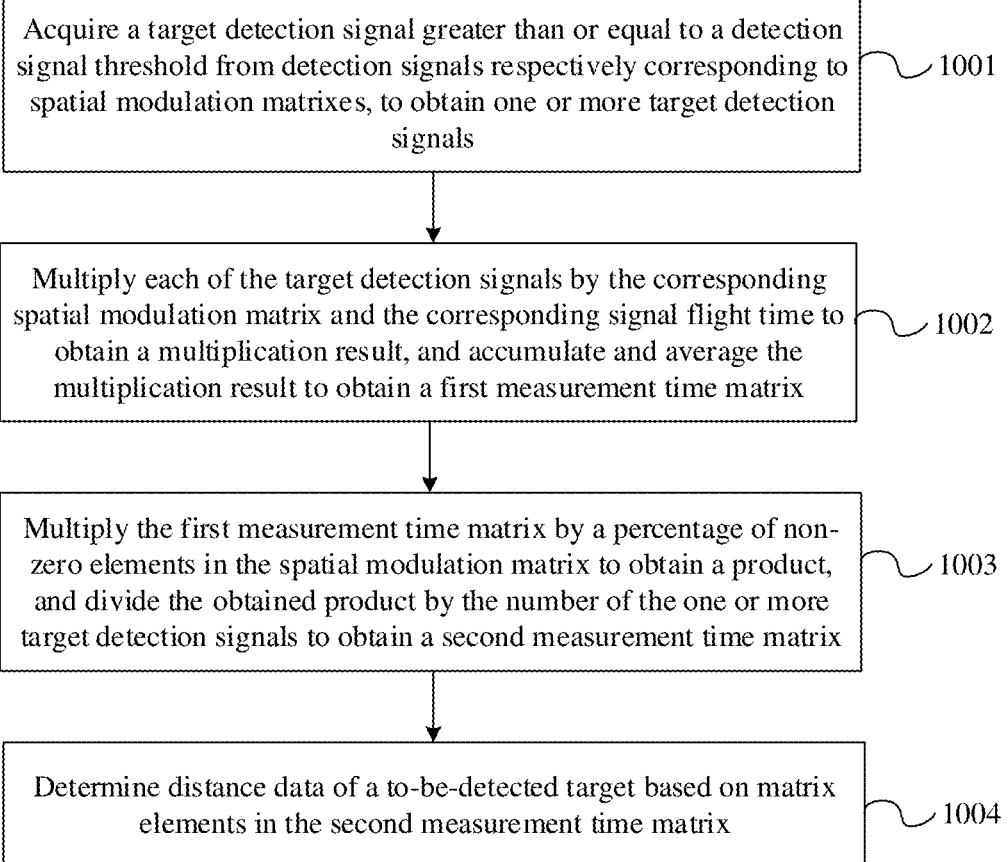

Acquire a target detection signal greater than or equal to a detection signal threshold from detection signals respectively corresponding to spatial modulation matrixes, to obtain one or more target detection signals — 1001

Multiply each of the target detection signals by the corresponding spatial modulation matrix and the corresponding signal flight time to obtain a multiplication result, and accumulate and average the multiplication result to obtain a first measurement time matrix — 1002

Multiply the first measurement time matrix by a percentage of non-zero elements in the spatial modulation matrix to obtain a product, and divide the obtained product by the number of the one or more target detection signals to obtain a second measurement time matrix — 1003

Determine distance data of a to-be-detected target based on matrix elements in the second measurement time matrix — 1004

FIG. 10

DETECTION METHOD AND DETECTION APPARATUS

CROSS REFERENCE TO RELATED APPLICATION

The present application is the national phase of PCT International Application No. PCT/CN2020/135675, which claims priority to Chinese Patent Application No. CN201911371643.6, titled "DETECTION METHOD AND DETECTION APPARATUS", filed on Dec. 26, 2019 with the Chinese Patent Office, both of which are incorporated herein by reference in their entireties.

FIELD

The present disclosure relates to the technical field of radar detection, and in particular to a detection method and a detection device.

BACKGROUND

With the popularity and development of radar detection applications, the radar is developed towards high integration, light weight and low cost.

In the conventional technology, the lidars generally have a mechanical scanning structure by which the electromagnetic wave is emitted to irradiate a to-be-detected target and an echo thereof is received, so as to determine information such as the distance from the to-be-detected target to a position where the electromagnetic wave is emitted, the distance change rate (radial velocity), azimuth and altitude.

However, the distance information of only one point is obtained in each detection with the mechanical scanning structure in the conventional technology, which has relatively large limitations and low detection accuracy.

SUMMARY

An object of the present disclosure is to provide a detection method and a detection device, to improve detection accuracy of the detection device.

In order to achieve the above object, technical solutions provided in the present disclosure are described as follows.

In a first aspect, a detection method is provided in the present disclosure. The method includes:

transmitting a first waveform signal to a to-be-detected target and receiving a second waveform signal reflected by the to-be-detected target based on the first waveform signal, where the second waveform signal carries a piece of spatial modulation information;

generating a detection signal corresponding to the piece of spatial modulation information based on the second waveform signal and acquiring a signal flight time carried by the detection signal; and determining distance data of the to-be-detected target based on multiple pieces of spatial modulation information and signal flight times respectively corresponding to the multiple pieces of spatial modulation information.

Optionally, the generating a detection signal corresponding to the piece of spatial modulation information based on the second waveform signal and acquiring a signal flight time carried by the detection signal includes:

generating an electrical signal corresponding to the second waveform signal as the detection signal; and acquiring the signal flight time carried by the detection signal based on the detection signal and the piece of spatial modulation information corresponding to the detection signal.

Optionally, the transmitting a first waveform signal to a to-be-detected target includes:

generating the first waveform signal;

modulating the first waveform signal based on the piece of spatial modulation information; and transmitting the first waveform signal that is modulated to the to-be-detected target.

Optionally, the receiving a second waveform signal reflected by the to-be-detected target based on the first waveform signal includes:

receiving a third waveform signal reflected by the to-be-detected target based on the first waveform signal; and modulating the third waveform signal based on the piece of spatial modulation information to obtain the second waveform signal.

Optionally, each piece of spatial modulation information includes a spatial modulation matrix, and the spatial modulation matrix includes elements having at least two different values corresponding to different light intensities.

Optionally, the determining distance data of the to-be-detected target based on multiple pieces of spatial modulation information and signal flight times respectively corresponding to the multiple pieces of spatial modulation information includes:

acquiring a target detection signal greater than or equal to a detection signal threshold from detection signals respectively corresponding to spatial modulation matrixes, to obtain one or more target detection signals;

multiplying each of the target detection signals by the corresponding spatial modulation matrix and the corresponding signal flight time to obtain a multiplication result, and accumulating and averaging the multiplication result to obtain a first measurement time matrix;

multiplying the first measurement time matrix by a percentage of non-zero elements in the spatial modulation matrix to obtain a product, and dividing the obtained product by the number of the one or more target detection signals to obtain a second measurement time matrix; and determining the distance data of the to-be-detected target based on matrix elements in the second measurement time matrix.

Optionally, before the acquiring a target detection signal greater than or equal to a detection signal threshold from detection signals respectively corresponding to spatial modulation matrixes, to obtain one or more target detection signals, the method further includes:

determining the detection signal threshold based on the detection signals respectively corresponding to the spatial modulation matrixes.

Optionally, after the acquiring a target detection signal greater than or equal to a detection signal threshold from detection signals respectively corresponding to spatial modulation matrixes, to obtain one or more target detection signals, the method further includes:

determining a weight corresponding to each of the target detection signals based on a magnitude of the target detection signal.

Optionally, the multiplying each of the target detection signals by the corresponding spatial modulation matrix and the corresponding signal flight time to obtain a multiplication result, and accumulating and averaging the multiplication result to obtain a first measurement time matrix includes:

multiplying each of the target detection signals by the corresponding weight, the corresponding spatial modulation matrix, and the corresponding signal flight time to obtain a multiplication result, and accumulating and averaging the multiplication result to obtain the first measurement time matrix.

Optionally, the determining a weight corresponding to each of the target detection signals based on a magnitude of the target detection signal includes:

determining the weight corresponding to the target detection signal based on the detection signal threshold and the magnitude of the target detection signal.

Optionally, after the acquiring a target detection signal greater than or equal to a detection signal threshold from detection signals respectively corresponding to spatial modulation matrixes, to obtain one or more target detection signals, the method further includes:

multiplying each of the target detection signals by the corresponding spatial modulation matrix to obtain a multiplication result, and accumulating and averaging the multiplication result to obtain the distance data or spectral data of the to-be-detected target.

Optionally, after the multiplying each of the target detection signals by the corresponding spatial modulation matrix to obtain a multiplication result, and accumulating and averaging the multiplication result to obtain the distance data or spectral data of the to-be-detected target, the method further includes:

determining whether to update the multiple pieces of spatial modulation information based on the distance data and/or spectral data of the to-be-detected target.

In a second aspect, a detection device is further provided in the present disclosure. The device includes: a transmitting system, a receiving system and a processing system. The transmitting system is configured to transmit a first waveform signal to a to-be-detected target. The receiving system is configured to: receive a second waveform signal reflected by the to-be-detected target based on the first waveform signal, where the second waveform signal carries a piece of spatial modulation information; and generate a detection signal corresponding to the piece of spatial modulation information and acquire a signal flight time carried by the detection signal. The processing system is configured to determine distance data of the to-be-detected target based on multiple pieces of spatial modulation information and signal flight times respectively corresponding to the plurality of pieces of spatial modulation information.

Optionally, the receiving system includes: a signal light processing unit and a flight time unit. The signal light processing unit is configured to generate an electrical signal corresponding to the second waveform signal as the detection signal. The flight time unit is configured to acquire the signal flight time carried by the detection signal based on the detection signal and the piece of spatial modulation information corresponding to the detection signal.

Optionally, the transmitting system includes: a waveform signal source, a spatial light modulator and a transmitting unit that are arranged in sequence. The waveform signal source is configured to generate the first waveform signal. The spatial light modulator is configured to modulate the first waveform signal based on the piece of spatial modulation information. The transmitting unit is configured to transmit the first waveform signal that is modulated to the to-be-detected target.

Optionally, the receiving system includes: an acquiring unit and a signal light processing unit. The acquiring unit is configured to receive a third waveform signal reflected by the to-be-detected target based on the first waveform signal. The signal light processing unit is configured to modulate the third waveform signal based on the piece of spatial modulation information to obtain the second waveform signal.

Optionally, each piece of spatial modulation information includes a spatial modulation matrix, and the spatial modulation matrix includes elements having at least two different values corresponding to different light intensities.

Optionally, the processing system includes: a signal processing unit and a control unit. The signal processing unit is configured to acquire a target detection signal greater than or equal to a detection signal threshold from detection signals respectively corresponding to spatial modulation matrixes, to obtain one or more target detection signals. The control unit is configured to: multiply each of the target detection signals by the corresponding spatial modulation matrix and the corresponding signal flight time to obtain a multiplication result, and accumulate and average the multiplication result to obtain a first measurement time matrix; multiply the first measurement time matrix by a percentage of non-zero elements in the spatial modulation matrix to obtain a product, and divide the obtained product by the number of the one or more target detection signals to obtain a second measurement time matrix; and determine the distance data of the to-be-detected target based on matrix elements in the second measurement time matrix.

Optionally, the control unit is further configured to determine the detection signal threshold based on the detection signals respectively corresponding to the spatial modulation matrixes.

Optionally, the control unit is further configured to determine a weight corresponding to each of the target detection signals based on a magnitude of the target detection signal. Correspondingly, the control unit is configured to multiply each of the target detection signals by the corresponding weight, the corresponding spatial modulation matrix, and the corresponding signal flight time to obtain a multiplication result, and accumulate and average the multiplication result to obtain the first measurement time matrix.

Optionally, the control unit is configured to determine the weight corresponding to the target detection signal based on the detection signal threshold and the magnitude of the target detection signal.

Optionally, the control unit is configured to multiply each of the target detection signals by the corresponding spatial modulation matrix to obtain a multiplication result, and accumulate and average the multiplication result to obtain the distance data or spectral data of the to-be-detected target.

Optionally, the control unit is configured to determine whether to update the multiple pieces of spatial modulation information based on the distance data and/or spectral data of the to-be-detected target.

Compared with the conventional technology, the present disclosure has the following advantageous effects.

In the embodiments of the present disclosure, the first waveform signal is transmitted to the to-be-detected target, and the second waveform signal reflected by the to-be-detected target based on the first waveform signal is received, where the second waveform signal carries a piece of spatial modulation information. Further, the detection signal corresponding to the piece of spatial modulation information is generated based on the second waveform signal, and the signal flight time carried by the detection signal is acquired. The distance data of the to-be-detected target is determined based on the multiple pieces of spatial modulation information and signal flight times respectively corresponding to the multiple pieces of spatial modulation information. In this way, the spatial modulation information and the signal flight time are acquired based on the waveform signal reflected by the detection target, so that distance data with a higher resolution than the detection device is acquired, thereby improving the measurement accuracy.

Other features and advantages of the present disclosure are set forth in the following description, and are partly apparent from the description, or are learned by implementing the present disclosure. The object and other advantages of the present disclosure may be realized and obtained by structures particularly stated in the specification, the claims and the drawings.

BRIEF DESCRIPTION OF THE DRAWINGS

In order to illustrate technical solutions of the present disclosure more clearly, the drawings used in the embodiments are briefly introduced in the following. It should be understood that the drawings only show some embodiments of the present disclosure, and should not be regarded as a limitation of the scope. Other related drawings may be obtained by those skilled in the art from these drawings without any creative effort.

FIG. 6a to FIG. 6e are schematic diagrams showing detection results of a detection device according to an embodiment of the present disclosure;

FIG. 7 is a schematic flowchart of a detection method according to an embodiment of the present disclosure;

FIG. 10 is a schematic flowchart of a detection method according to another embodiment of the present disclosure.

DETAILED DESCRIPTION OF EMBODIMENTS

Figure 1:
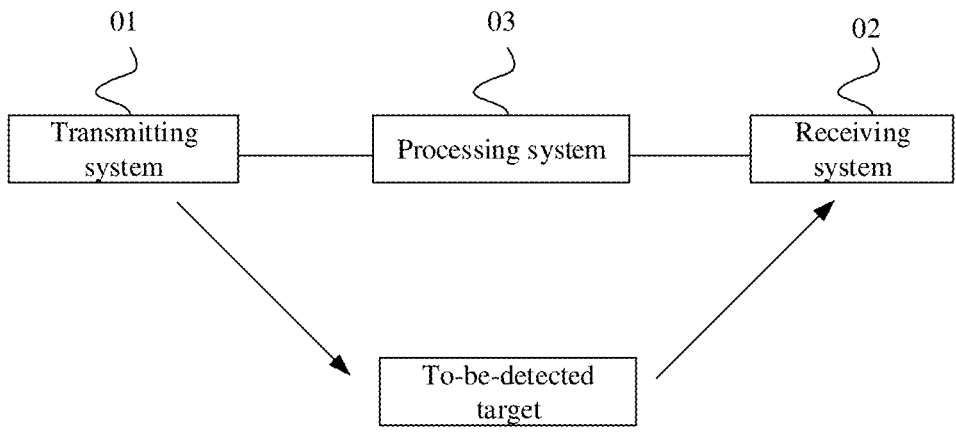
FIG. 1 is a schematic structural diagram of a detection device according to an embodiment of the present disclosure.

The technical solutions in the present disclosure are clearly and completely described below with reference to the drawings in the present disclosure.

It should be noted that similar numerals and letters refer to similar items in the drawings. Therefore, if an item is defined in a drawing, the item is not required to be defined and explained in subsequent drawings.

Before describing the present disclosure in detail, an application scenario of the present disclosure is introduced below.

In view of low detection accuracy of existing lidars, a detection method and a detection device are proposed in the present disclosure to improve the detection accuracy.

FIG. 1 is a schematic structural diagram of a detection device according to an embodiment of the present disclosure. The detection device may be a lidar device or may be integrated in a lidar. Optionally, the detection device may be applied to a compression program system of the lidar.

As shown in FIG. 1, the detection device may include: a transmitting system 01, a receiving system 02, and a processing system 03.

The transmitting system 01 is configured to transmit a first waveform signal to a to-be-detected target.

The receiving system 02 is configured to receive a second waveform signal reflected by the to-be-detected target based on the first waveform signal. The second waveform signal carries a piece of spatial modulation information. The receiving system is further configured to: generate a detection signal corresponding to the piece of spatial modulation information based on the second waveform signal, and acquire a signal flight time carried by the detection signal.

Optionally, the first waveform signal and the second waveform signal may be light signals such as laser signals, or other waveform signals such as acoustic wave signals, which are not limited in the present disclosure.

The processing system 03 is configured to determine distance data of the to-be-detected target based on multiple pieces of spatial modulation information and signal flight times respectively corresponding to the multiple pieces of spatial modulation information.

The receiving system may include a Time of Flight (TOF) chip. The second waveform signal reflected by the to-be-detected target may be focused on the TOF chip, and the light signal is obtained on the TOF chip.

After obtaining the signal flight time carried by the detection signal, the distance data of the to-be-detected target can be calculated according to the pieces of spatial modulation information and the signal flight times respectively corresponding to the pieces of spatial modulation information.

Optionally, a correlation operation is performed on the detection signal and the light signal obtained on the TOF chip. For example, the compressed sensing technology is utilized to obtain shape information of the to-be-detected target to obtain a distance image. A photoelectric sensor on the TOF chip may have a single pixel, by which the distance to the target is acquired by determining a time difference between pulses of an emission light and a signal light.

In this embodiment, the first waveform signal is transmitted to the to-be-detected target, and the second waveform signal reflected by the to-be-detected target based on the first waveform signal is received, where the second waveform signal carries a piece of spatial modulation information. Further, the detection signal corresponding to the piece of spatial modulation information is generated based on the second waveform signal, and the signal flight time carried by the detection signal is acquired. The distance data of the to-be-detected target is determined based on the multiple pieces of spatial modulation information and signal flight times respectively corresponding to the multiple pieces of spatial modulation information. In this way, the spatial modulation information is carried on to the signal emitted or reflected from the detection target, multiple signal flight time matrixes can be obtained based on multiple received waveform signal matrixes with the spatial modulation information, and distance data with a higher resolution than the detection device is acquired based on the multiple signal flight time matrixes, thereby improving the measurement accuracy.

Figure 2:
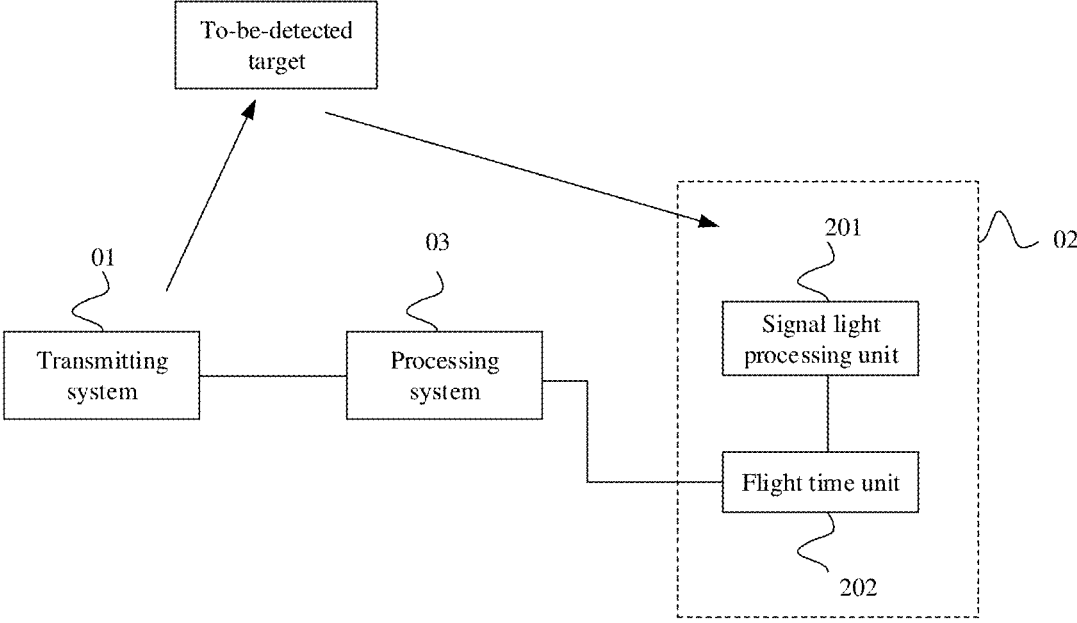
FIG. 2 is a schematic structural diagram of a detection device according to another embodiment of the present disclosure.

FIG. 2 is a schematic structural diagram of a detection device according to another embodiment of the present disclosure. Based on the embodiment shown in FIG. 1, the receiving system 02 may optionally include: a signal light processing unit 201 and a flight time unit 202, as shown in FIG. 2.

The signal light processing unit 201 is configured to generate an electrical signal corresponding to the second waveform signal as the detection signal.

Optionally, the first waveform signal and the second waveform signal may be light signals. After the to-be-detected target reflects the second waveform signal according to the first waveform signal, the reflected light is focused to the signal light processing unit 201, and the signal light processing unit 201 receives the second waveform signal and converts the light signal into an electrical signal as the detection signal.

Optionally, the detection signal may include a signal flight time.

Further, the detection signal may further include spectral data, which is not limited herein.

The flight time unit 202 is configured to acquire the signal flight time carried by the detection signal based on the detection signal and the piece of spatial modulation information corresponding to the detection signal.

It should be noted that, in the lidar, the first waveform signal may be spatially modulated in the transmitting system 01 or in the receiving system 02, so that the second waveform signal carries the spatial modulation information, which is not limited in the embodiments of the present disclosure.

Figure 3:
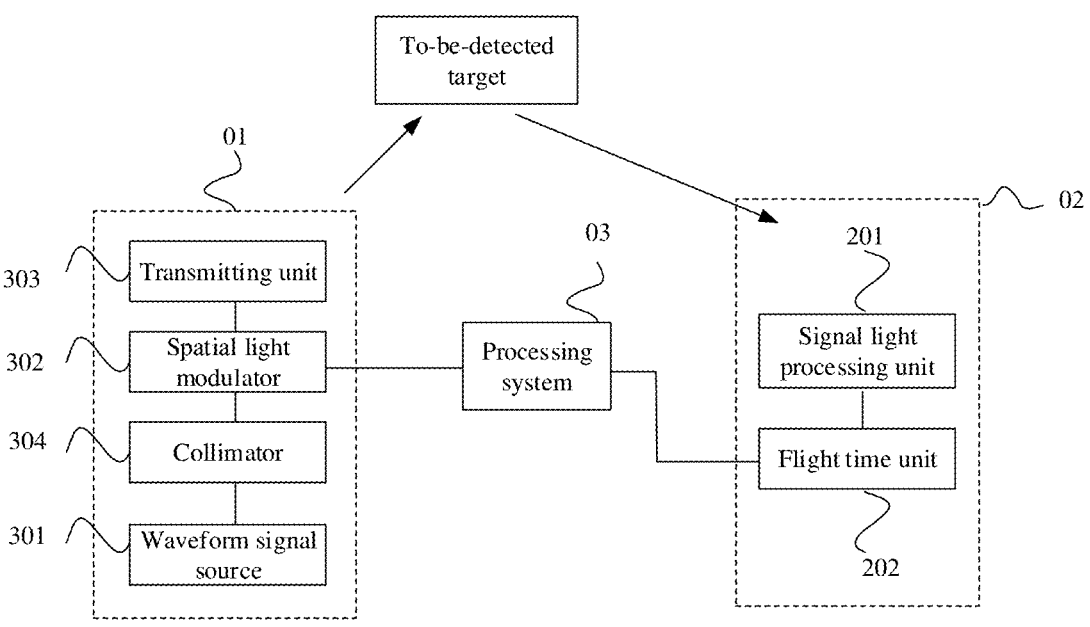
FIG. 3 is a schematic structural diagram of a detection device according to another embodiment of the present disclosure.

FIG. 3 is a schematic structural diagram of a detection device according to another embodiment of the present disclosure. The following description is given by taking the spatial light modulation performed in the transmitting system 01 as an example. Based on the embodiment of FIG. 1, the transmitting system 01 may optionally include a waveform signal source 301, a spatial light modulator 302 and a transmitting unit 303 that are arranged in sequence, as shown in FIG. 3.

The waveform signal source 301 is configured to generate the first waveform signal.

Optionally, in this embodiment, the waveform signal source 301 may be a laser transmitter, and the laser used for ranging and imaging is generated by the waveform signal source 301. Specifically, the waveform signal source may generate a pulsed laser with a desired wavelength as the first waveform signal, which is not limited herein. The first waveform signal may be implemented in other forms.

The spatial light modulator 302 is configured to modulate the first waveform signal based on the piece of spatial modulation information.

The spatial light modulator 302 may actively modulate a parameter of the first waveform signal, to write the spatial modulation information into the light wave.

The spatial light modulator 302 includes but is not limited to, a microlens array, a micro-mirror array, or a spatial light valve.

The transmitting unit 303 is configured to transmit the first waveform signal that is modulated to the to-be-detected target.

Optionally, referring to FIG. 3, the transmitting system 01 may further include: a collimator 304. The collimator 304 may be provided between the waveform signal source 301 and the spatial light modulator 302. The collimator 304 may be a shaping collimator, which is not limited herein.

The first waveform signal generated by the waveform signal source 301 is adjusted by the collimator 304, so that the laser beam is adjusted to have a desired divergence angle and radius.

Figure 4:
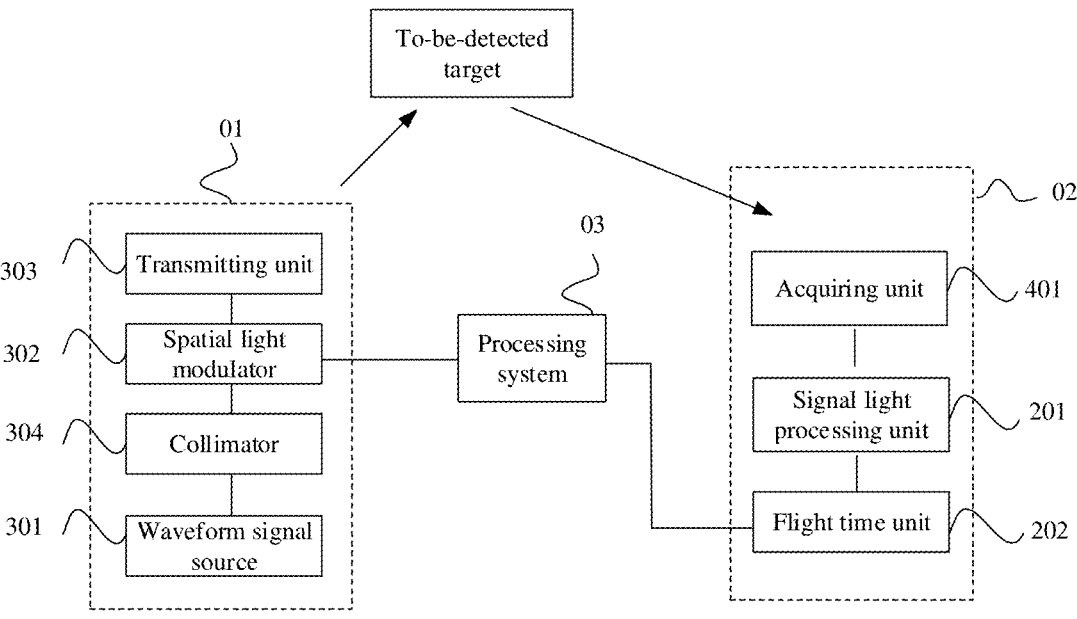
FIG. 4 is a schematic structural diagram of a detection device according to another embodiment of the present disclosure.

FIG. 4 is a schematic structural diagram of a detection device according to another embodiment of the present disclosure. In this embodiment, the spatial modulation is performed in the receiving system 02. Based on the above embodiments, the receiving system 02 includes: an acquiring unit 401 and the signal light processing unit 201. It should be noted that, referring to FIG. 2 and FIG. 4, One or both of the acquiring unit 401 and the flight time unit 202 may be provided, which is determined according to a specific implementation, and is not limited herein.

The acquiring unit 401 is configured to receive a third waveform signal reflected by the to-be-detected target based on the first waveform signal.

Optionally, in the case that the first waveform signal is a light signal, the acquiring unit 401 acquires the light signal emitted by the to-be-detected target.

The signal light processing unit 201 is configured to modulate the third waveform signal based on the piece of spatial modulation information to obtain the second waveform signal.

Optionally, the spatial modulation information may be in the form of a matrix, such as a spatial modulation matrix or a non-spatial modulation matrix. The matrix may include elements having at least two different values corresponding to different light intensities, where the element may be in a form of a complex number or a real number.

Figure 5:
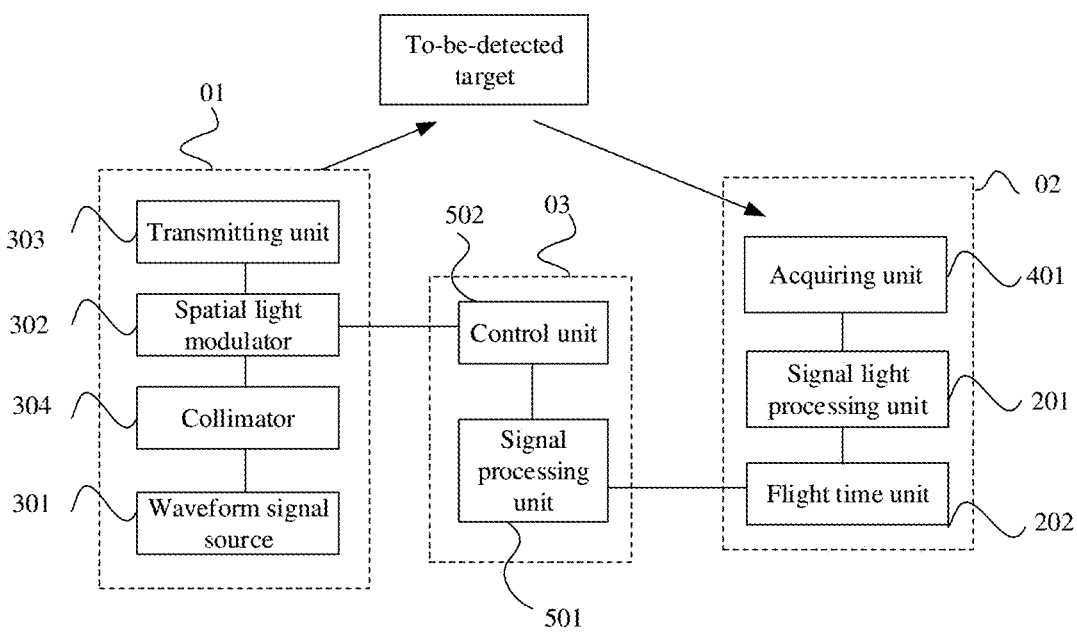
FIG. 5 is a schematic structural diagram of a detection device according to another embodiment of the present disclosure.
Figure 6A:
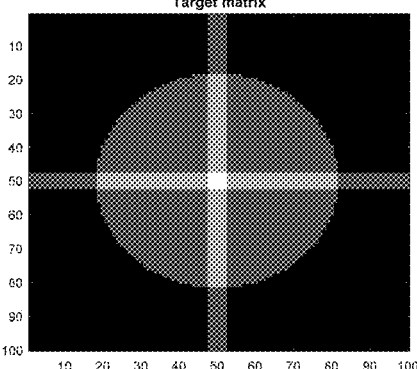
Figure 6B:
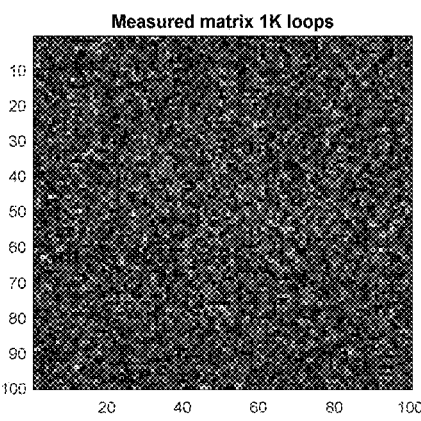
Figure 6C:
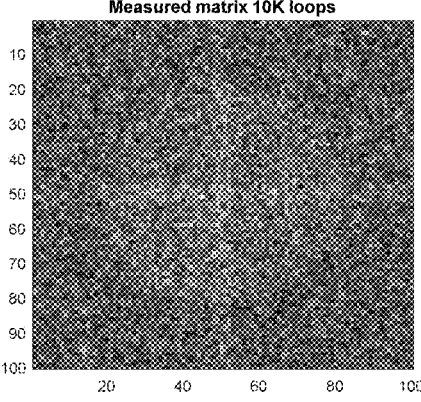
Figure 6D:
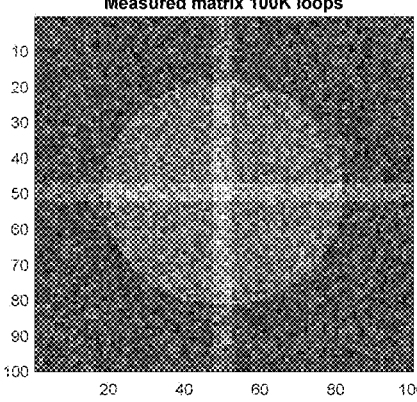

FIG. 5 is a schematic structural diagram of a detection device according to another embodiment of the present disclosure. In this embodiment, the processing system 03 may include a signal processing unit 501 and a control unit 502.

The signal processing unit 501 is configured to acquire a target detection signal greater than or equal to a detection signal threshold from detection signals respectively corresponding to spatial modulation matrixes, to obtain one or more target detection signals.

The control unit 502 is configured to: multiply each target detection signal by the corresponding spatial modulation matrix and the corresponding signal flight time to obtain a multiplication result, and accumulate and average the multiplication result to obtain a first measurement time matrix; multiply the first measurement time matrix by a percentage of non-zero elements in the modulation matrix to obtain a product, and divide the obtained product by the number of the one or more target detection signals to obtain a second measurement time matrix; and determine the distance to the to-be-detected target data based on matrix elements in the second measurement time matrix.

In this embodiment, the target detection signals are in a one-to-one correspondence with the spatial modulation matrixes, improving the efficiency and accuracy of lidar imaging and ranging.

Optionally, the signal processing unit 501 may process the received electrical signal to obtain a result of compression imaging.

In a specific implementation, the signal processing unit 501 and the control unit 502 may perform calculation in parallel. The signal processing unit 501 is used to acquire the target detection signal. The control unit 502 is used to acquire the spatial modulation matrix. For example, the control unit 502 controls the spatial light modulator 302 to generate the spatial modulation matrix.

The spatial modulation matrix may be a randomly generated matrix, for example, denoted as $M_k$. It is assumed that the control unit 502 generates k spatial modulation matrixes $M_1$, $M_2$, . . . , and $M_k$, where k is an integer greater than 0 and represents the number of detections. Specifically, the spatial modulation matrixes $M_1$, $M_2$, . . . and $M_k$ correspond to the one or more target detection signals in one-to-one correspondence, and the target detection signals may be denoted as $n_1$, $n_2$, . . . and $n_k$.

In this embodiment, each piece of spatial modulation information includes a spatial modulation matrix as an example. The spatial modulation matrix may be an n-dimensional matrix having two element values 0 and 1, where the element value 0 indicates no light, and the element value 1 indicates that there exists a light. More specifically, the element value 1 may indicate that there exists a light after modulation and the light intensity thereof is the same as that before modulation. Similarly, an element value ½ in the matrix may indicate that the modulated light intensity is half of that before modulation. For elements having element values between 0 and 1, the modulation may be implemented by different reflectivity or transmissivity of optical elements for different light intensities, which is not limited herein.

Optionally, the number of elements having the element value 1 is not more than half of the total number of elements, but not limited thereto.

For example, the matrix may be expressed as $$M_k = \begin{bmatrix} 1 & 0 & 0 & \dots & 1 \\ 0 & 0 & 0 & \dots & 0 \\ 0 & 1 & 0 & \dots & 0 \\ \vdots & \vdots & \vdots & \ddots & \vdots \\ 0 & 0 & 1 & \dots & 1 \end{bmatrix}.$$

Further, the control unit 502 is further configured to determine the detection signal threshold based on the detection signals respectively corresponding to the spatial modulation matrixes.

An average $n_{avg}$ and a variance $n_{std}$ of the detection signals may be obtained according to the one or more target detection signals $n_1$, $n_2$, . . . and $n_k$, and the detection signal threshold is determined according to the average $n_{avg}$ and the variance $n_{std}$.

Optionally, the detection signal threshold is determined as $n_{thd}=n_{avg}+2n_{std}$. The size of $n_{thd}$ may be adjusted as required, for example, may be adjusted in a range of $n_{avg}$ to $(n_{avg}+3n_{std})$, which is not limited herein.

In a specific implementation, the detection signals respectively corresponding to the spatial modulation matrixes may be recorded as a vector $[n_1, n_2 \ldots n_k]$. The detection signals less than the detection signal threshold in the vector are set as 0, and the remaining detection signals in the vector are determined as the target detection signals. Each remaining signal is multiplied by the corresponding spatial modulation matrix and the corresponding signal flight time to obtain a multiplication result. The multiplication result is accumulated and averaged to obtain the first measurement time matrix.

Optionally, if the ranging is performed by means of the compression imaging, a time (signal flight time) $t_k$ is obtained in each measurement, which is expressed as $t_k=2$ (L/c), where L represents an average distance to the to-be-detected target, and c represents a light speed in an ambient medium. After k detections, a signal flight time matrix can be obtained, which is expressed as $t =[t_1, t_2, \ldots, t_k]$. The signal flight time matrix is multiplied by the spatial modulation matrix $M_k$ to obtain a matrix T, which is denoted as $T=[T_1, T_2, \ldots, T_k]$.

Elements in the matrix T are summed to obtain a value $T_{total}$, which is expressed as $T_{total}=T_1+T_2+ \ldots +T_k$ is multiplied by percentage of non-zero elements in the $M_k$ to obtain a product. The obtained product is divided by the number of non-zero matrixes in the matrix T, to obtain an average flight delay time $T_{avg}$ of elements on a corresponding array. Based on the $T_{avg}$, the distance from each element in the array to the detection target is calculated according to a formula $L_{avg} =T_{avg} \times c/2$.

In addition, the control unit 502 is further configured to determine a weight corresponding to each of the target detection signals based on a magnitude of the target detection signal.

Optionally, the weight of the target detection signal may be positively correlated with the magnitude of the target detection signal, but is not limited thereto.

Correspondingly, the control unit 502 is configured to multiply each of the target detection signals by the corresponding weight, the corresponding spatial modulation matrix, and the corresponding signal flight time to obtain a multiplication result, and accumulate and average the multiplication result to obtain the first measurement time matrix.

Optionally, the control unit 502 is configured to determine the weight corresponding to each of the target detection signals based on the detection signal threshold and the magnitude of the target detection signal.

For example, different weights v are respectively assigned to elements in the vector $[n_1, n_2 \ldots n_k]$ according to the detection threshold $n_{thd}$. Optionally, the weight is determined according to a formula $V_k=n_k/n_{thd}$.

The control unit 502 is further configured to multiply each of the target detection signals by the corresponding spatial modulation matrix to obtain a multiplication result, and accumulate and average the multiplication result to obtain the distance data or spectral data of the to-be-detected target.

In this embodiment, the finally obtained detection result may include one or both of the distance data and the spectral data. Compared with the conventional technology, the obtained detection result is more complete and accurate. That is, the distance and image information of an area whose information cannot be originally obtained can be obtained, thereby achieving complete imaging and distance detection, and making up for the defects of traditional lidars.

In addition, the control unit 502 is further configured to: after the distance data or the spectral data is obtained, determine whether to update the pieces of spatial modulation information based on the distance data and/or spectral data of the to-be-detected target. Specifically, the control unit may analyze clarity and/or integrity of the distance image and/or spectral image according to the obtained distance data and/or spectral data, and perform update based on an interval in which the clarity and/or integrity in the analysis result does not reach a threshold.

The spatial modulation information is updated. Furthermore, the above method may be executed repeatedly to better obtain a restored image.

Optionally, the number of the element whose value is equal to 1 in each of the matrixes $M_1$, $M_2$, . . . and $M_k$ is repeatedly adjusted to obtain the optimal solution, that is, to obtain the number of the element whose value is equal to 1 in a case that the program has the best effect and the noise is lowest.

FIG. 6 is a schematic diagram showing detection results of a detection device according to an embodiment of the present disclosure. In FIG. 6, FIG. 6*a* shows a detection target image of the to-be-detected target that is obtained by the detection device using the above method, FIG. 6*b* shows a restoration result obtained after 1000 samplings on the image, FIG. 6*c* shows a restoration result obtained after 10000 samplings on the image, FIG. 6*d* shows a restoration result obtained after 100000 samplings on the image, and FIG. 6*e* shows a restoration result obtained after 1000000 samplings on the image.

FIG. 7 is a schematic flowchart of a detection method according to an embodiment of the present disclosure. The method is applicable to a radar device, such as a lidar. More specifically, the method may be applied to a compression program system of the lidar. The compression program system may be integrated in the detection device as described in the above embodiments, and an implementation principle and a technical effect thereof are similar to those in the above embodiments. As shown in FIG. 7, the method includes the following steps S701 to S703.

In S701, a first waveform signal is transmitted to a to-be-detected target, and a second waveform signal reflected by the to-be-detected target based on the first waveform signal is received.

The second waveform signal carries a piece of spatial modulation information.

It should be noted that, in the lidar, the first waveform signal may be spatially modulated in a transmitting system or in a receiving system, which is not limited in the embodiments of the present disclosure.

In S702, a detection signal corresponding to the piece of spatial modulation information is generated based on the second waveform signal, and a signal flight time carried by the detection signal is acquired.

The second waveform signal reflected by the to-be-detected target may be focused on a Time of Flight (TOF) chip, and a light signal may be obtained on the TOF chip.

In S703, based on multiple pieces of spatial modulation information and signal flight times respectively corresponding to the multiple pieces of spatial modulation information, distance data of the to-be-detected target is determined.

After obtaining the signal flight time carried by the detection signal, the distance data of the to-be-detected target can be calculated according to the pieces of spatial modulation information and the signal flight times respectively corresponding to the pieces of spatial modulation information.

Optionally, a correlation operation is performed on the detection signal and the light signal obtained on the TOF chip. For example, the compressed sensing technology is utilized to obtain shape information of the to-be-detected target to obtain a distance image.

In this embodiment, the first waveform signal is transmitted to the to-be-detected target, and the second waveform signal reflected by the to-be-detected target based on the first waveform signal is received, where the second waveform signal carries a piece of spatial modulation information. Further, the detection signal corresponding to the piece of spatial modulation information is generated based on the second waveform signal, and the signal flight time carried by the detection signal is acquired. The distance data of the to-be-detected target is determined based on the multiple pieces of spatial modulation information and signal flight times respectively corresponding to the multiple pieces of spatial modulation information. In this way, the spatial modulation information and the signal flight time are acquired based on the waveform signal reflected by the detection target, so that distance data with a higher resolution than the detection device is acquired, thereby improving the measurement accuracy.

Optionally, the process of generating the detection signal corresponding to the piece of spatial modulation information based on the second waveform signal and acquiring the signal flight time carried by the detection signal is performed by the following steps including:

generating an electrical signal corresponding to the second waveform signal as the detection signal; and acquiring the signal flight time carried by the detection signal based on the detection signal and the piece of spatial modulation information corresponding to the detection signal.

Figure 8:
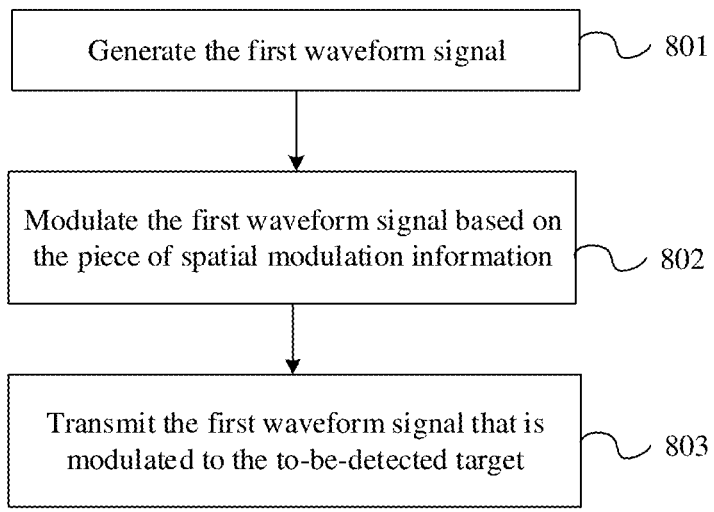
FIG. 8 is a schematic flowchart of a detection method according to another embodiment of the present disclosure.

FIG. 8 is a schematic flowchart of a detection method according to another embodiment of the present disclosure. As shown in FIG. 8, the process of transmitting the first waveform signal to the to-be-detected target may be performed by the following steps S801 to S803.

In S801, the first waveform signal is generated.

In S802, the first waveform signal is modulated based on the piece of spatial modulation information.

In S803, the first waveform signal that is modulated is transmitted to the to-be-detected target.

In this embodiment, the modulation is performed before the waveform signal is transmitted.

Figure 9:
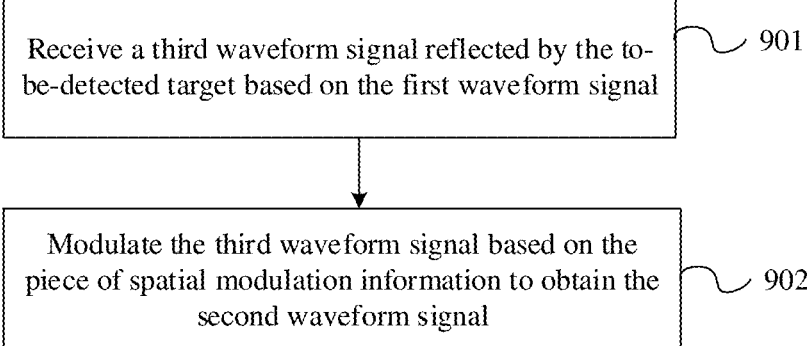
FIG. 9 is a schematic flowchart of a detection method according to another embodiment of the present disclosure.

FIG. 9 is a schematic flowchart of a detection method according to another embodiment of the present disclosure. As shown in FIG. 9, the process of receiving the second waveform signal reflected by the to-be-detected target based on the first waveform signal may be performed by the following steps S901 and S902.

In S901, a third waveform signal reflected by the to-be-detected target based on the first waveform signal is received.

In S902, the third waveform signal is modulated based on the piece of spatial modulation information to obtain the second waveform signal.

In this embodiment, the received reflection waveform signal is modulated.

Further, the piece of spatial modulation information includes a spatial modulation matrix, and the spatial modulation matrix includes elements having at least two different values corresponding to different light intensities.

FIG. 10 is a schematic flowchart of a detection method according to another embodiment of the present disclosure. As shown in FIG. 10, the process of determining the distance data of the to-be-detected target based on the multiple pieces of spatial modulation information and signal flight times respectively corresponding to the multiple pieces of spatial modulation information may be performed by the following steps S1001 to S1004.

In S1001, a target detection signal greater than or equal to a detection signal threshold is acquired from detection signals respectively corresponding to spatial modulation matrixes to obtain one or more target detection signals.

In S1002, each of the target detection signals is multiplied by the corresponding spatial modulation matrix and the corresponding signal flight time to obtain a multiplication result, and the multiplication result is accumulated and averaged to obtain a first measurement time matrix.

In S1003, the first measurement time matrix is multiplied by a percentage of non-zero elements in the spatial modulation matrix to obtain a product, and the obtained product is divided by the number of the one or more target detection signals to obtain a second measurement time matrix.

In S1004, the distance data of the to-be-detected target is determined based on matrix elements in the second measurement time matrix.

Further, before acquiring the target detection signal greater than or equal to the detection signal threshold from the detection signals respectively corresponding to the spatial modulation matrixes, to obtain the one or more target detection signals, the detection signal threshold may be determined based on the detection signals respectively corresponding to the spatial modulation matrixes.

In order to further optimize the algorithm, after acquiring the target detection signal greater than or equal to the detection signal threshold from the detection signals respectively corresponding to spatial modulation matrixes to obtain the one or more target detection signals, a weight corresponding to each of the target detection signals may be determined based on a magnitude of the target detection signal.

Correspondingly, the process of multiplying each of the target detection signals by the corresponding spatial modulation matrix and the corresponding signal flight time to obtain the multiplication result and accumulating and averaging the multiplication result to obtain the first measurement time matrix may be performed by: multiplying each of the target detection signals by the corresponding weight, the corresponding spatial modulation matrix, and the corresponding signal flight time to obtain a multiplication result, and accumulating and averaging the multiplication result to obtain the first measurement time matrix.

The process of determining the weight corresponding to each of the target detection signals based on the magnitude of the target detection signal may be performed by determining the weight corresponding to the target detection signal based on the detection signal threshold and the magnitude of the target detection signal.

In an optional embodiment, the output result includes not only the distance data but also spectral data. That is, after acquiring the target detection signal greater than or equal to the detection signal threshold from detection signals respectively corresponding to the spatial modulation matrixes to obtain one or more target detection signals, each of the target detection signals is multiplied by the corresponding spatial modulation matrix to obtain a multiplication result, and the multiplication result is accumulated and averaged to obtain the distance data or spectral data of the to-be-detected target.

Further, after multiplying each of the target detection signals by the corresponding spatial modulation matrix to obtain a multiplication result and accumulating and averaging the multiplication result to obtain the distance data or spectral data of the to-be-detected target, the spatial modulation information is updated based on the distance data and/or spectral data of the to-be-detected target.

For the specific explanation of the method, reference may be made to the foregoing embodiments of the detection device, which will not be repeated here.

In the detection device and detection method according to the embodiments of the present disclosure, the original appearance of the to-be-detected target can be better reproduced when the sampling rate is lower than the Nyquist rate, and the demand for hardware can be reduced while acquiring the high-precision image, thereby reducing the complexity of the entire system and improving its reliability.

By acquiring the echo signal carrying different spatial modulation information matrixes for multiple times, redundant information in the current signal sampling is discarded, and a compressed sample is directly transformed from a continuous time signal. An image have a high definition and/or high completeness is extracted based on multiple samples. In terms of ranging or imaging, a sparse matrix is used to furthest restore original matrix information. In addition, in terms of irrelevance, useful information of a sparse signal may be acquired by compressing the signal into relative small sample data by means of a non-adaptive sampling method. It is proved in theory that the sampling method of compressed sensing is a simple operation of correlating a signal with a set of predetermined waveforms. These waveforms are required to be not correlation with a sparse space in which the signal is located. With respect to the ranging or imaging, a generated random matrix is not required to be correlation with any information of the target. That is, no prior knowledge of the target is required, and a purely random detection matrix can be used to obtain the target information as much as possible.

It should be noted that, relational terms such as "first" and "second" herein are only used to distinguish one entity or operation from another entity or operation, and do not necessarily require or imply there is such actual relationship or sequence between these entities or operations. Moreover, terms "comprising", "including" or any other variations thereof are intended to encompass a non-exclusive inclusion, such that a process, a method, an article or a device including a series of elements includes not only those elements, but also includes other elements that are not explicitly listed or inherent to such the process, method, article or device. Without further limitation, an element defined by a phrase "including a . . . " does not preclude the presence of additional identical elements in a process, method, article or device including the element.

Preferred embodiments of the present disclosure are given in the above description, and are not intended to limit the present disclosure. For those skilled in the art, the present disclosure may have various modifications and changes. Any modifications, equivalents and improvements made in the spirit and principle of the present disclosure should be included in the protection scope of the present disclosure.

The invention claimed is:

1. A detection method, comprising:

transmitting a first waveform signal to a to-be-detected target and receiving a second waveform signal reflected by the to-be-detected target based on the first waveform signal, wherein the second waveform signal carries a piece of spatial modulation information;

generating a detection signal corresponding to the piece of spatial modulation information based on the second waveform signal and acquiring a signal flight time carried by the detection signal; and determining distance data of the to-be-detected target based on a plurality of pieces of spatial modulation information and signal flight times respectively corresponding to the plurality of pieces of spatial modulation information, wherein each piece of spatial modulation information comprises a spatial modulation matrix, and the spatial modulation matrix comprises elements having at least two different values corresponding to different light intensities, and wherein the determining distance data of the to-be-detected target based on a plurality of pieces of spatial modulation information and signal flight times respectively corresponding to the plurality of pieces of spatial modulation information comprises:

acquiring a target detection signal greater than or equal to a detection signal threshold from detection signals respectively corresponding to spatial modulation matrixes, to obtain one or more target detection signals;

multiplying each of the target detection signals by the corresponding spatial modulation matrix and the corresponding signal flight time to obtain a multiplication result, and accumulating and averaging the multiplication result to obtain a first measurement time matrix;

multiplying the first measurement time matrix by a percentage of non-zero elements in the spatial modulation matrix to obtain a product, and dividing the obtained product by the number of the one or more target detection signals to obtain a second measurement time matrix; and determining the distance data of the to-be-detected target based on matrix elements in the second measurement time matrix.

2. The method according to claim 1, wherein before the acquiring a target detection signal greater than or equal to a detection signal threshold from detection signals respectively corresponding to spatial modulation matrixes, to obtain one or more target detection signals, the method further comprises:

determining the detection signal threshold based on the detection signals respectively corresponding to the spatial modulation matrixes.

3. The method according to claim 2, wherein after the acquiring a target detection signal greater than or equal to a detection signal threshold from detection signals respectively corresponding to spatial modulation matrixes, to obtain one or more target detection signals, the method further comprises:

determining a weight corresponding to each of the target detection signals based on a magnitude of the target detection signal;

and wherein the multiplying each of the target detection signals by the corresponding spatial modulation matrix and the corresponding signal flight time to obtain a multiplication result, and accumulating and averaging the multiplication result to obtain a first measurement time matrix comprises:

multiplying each of the target detection signals by the corresponding weight, the corresponding spatial modulation matrix, and the corresponding signal flight time to obtain a multiplication result, and accumulating and averaging the multiplication result to obtain the first measurement time matrix.

4. The method according to claim 3, wherein the determining a weight corresponding to each of the target detection signals based on a magnitude of the target detection signal comprises:

determining the weight corresponding to the target detection signal based on the detection signal threshold and the magnitude of the target detection signal.

5. The method according to claim 1, wherein after the acquiring a target detection signal greater than or equal to a detection signal threshold from detection signals respectively corresponding to spatial modulation matrixes, to obtain one or more target detection signals, the method further comprises:

multiplying each of the target detection signals by the corresponding spatial modulation matrix to obtain a multiplication result, and accumulating and averaging the multiplication result to obtain the distance data or spectral data of the to-be-detected target.

6. The method according to claim 5, wherein after the multiplying each of the target detection signals by the corresponding spatial modulation matrix to obtain a multiplication result, and accumulating and averaging the multiplication result to obtain the distance data or spectral data of the to-be-detected target, the method further comprises:

determining whether to update the plurality of pieces of spatial modulation information based on the distance data and/or spectral data of the to-be-detected target.

7. A detection device, comprising:

a transmitting system configured to transmit a first waveform signal to a to-be-detected target;

a receiving system configured to: receive a second waveform signal reflected by the to-be-detected target based on the first waveform signal, wherein the second waveform signal carries a piece of spatial modulation information; and generate a detection signal corresponding to the piece of spatial modulation information and acquire a signal flight time carried by the detection signal; and a processing system configured to determine distance data of the to-be-detected target based on a plurality of pieces of spatial modulation information and signal flight times respectively corresponding to the plurality of pieces of spatial modulation information, wherein each piece of spatial modulation information comprises a spatial modulation matrix, and the spatial modulation matrix comprises elements having at least two different values corresponding to different light intensities, and wherein the processing system comprises:

a signal processing unit configured to acquire a target detection signal greater than or equal to a detection signal threshold from detection signals respectively corresponding to spatial modulation matrixes, to obtain one or more target detection signals; and a control unit configured to: multiply each of the target detection signals by the corresponding spatial modulation matrix and the corresponding signal flight time to obtain a multiplication result, and accumulate and average the multiplication result to obtain a first measurement time matrix; multiply the first measurement time matrix by a percentage of non-zero elements in the spatial modulation matrix to obtain a product, and divide the obtained product by the number of the one or more target detection signals to obtain a second measurement time matrix; and determine the distance data of the to-be-detected target based on matrix elements in the second measurement time matrix.

* * * * *